(12) United States Patent
Kikuchi et al.

(10) Patent No.: US 7,257,408 B2
(45) Date of Patent: Aug. 14, 2007

(54) RADIO COMMUNICATION SYSTEM AND TRANSMISSION MODE SELECTING METHOD

(75) Inventors: Shingo Kikuchi, Tokyo (JP); Shousei Yoshida, Tokyo (JP); Yoshikazu Kakura, Tokyo (JP); Akihisa Ushirokawa, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/562,830

(22) PCT Filed: Jun. 28, 2004

(86) PCT No.: PCT/JP2004/009463

§ 371 (c)(1),
(2), (4) Date: Dec. 29, 2005

(87) PCT Pub. No.: WO2005/002253

PCT Pub. Date: Jan. 6, 2005

(65) Prior Publication Data

US 2006/0234643 A1   Oct. 19, 2006

(30) Foreign Application Priority Data

Jun. 30, 2003 (JP) ............................. 2003-187156

(51) Int. Cl.
*H04Q 7/20* (2006.01)
(52) U.S. Cl. .................. 455/452.2; 455/69; 455/67.11; 455/452.1; 375/335; 370/334; 370/332; 370/343; 370/344

(58) Field of Classification Search ............. 455/452.1, 455/450, 69, 63.1, 67.13, 67.16, 277.2, 452.2, 455/67.11, 115.1, 426; 375/219; 370/332, 370/335, 343, 334, 508, 519, 468
See application file for complete search history.

(56) References Cited

U.S. PATENT DOCUMENTS

| 5,873,028 | A  | * | 2/1999 | Nakano et al. ................ 455/69 |
| 6,788,737 | B1 | * | 9/2004 | Miyoshi et al. ............. 375/219 |
| 2002/0123349 | A1 | * | 9/2002 | Miyoshi et al. ............. 455/450 |
| 2002/0173312 | A1 | * | 11/2002 | Takano et al. .............. 455/452 |

FOREIGN PATENT DOCUMENTS

| JP | 8-181653 A | 7/1996 |
| JP | 2001-196974 A | 7/2001 |
| JP | 2002-44168 A | 2/2002 |
| JP | 2002-101043 A | 4/2002 |
| JP | 2002-271294 A | 9/2002 |
| JP | 2003-37554 A | 2/2003 |
| JP | 2003-143071 A | 5/2003 |

* cited by examiner

*Primary Examiner*—Edan Orgad
*Assistant Examiner*—Junpeng Chen
(74) *Attorney, Agent, or Firm*—Sughrue Mion, PLLC (57) ABSTRACT

A radio communication system for quickly selecting an optimum transmission mode in accordance with the quality and situation of a propagation path is provided. The system comprises first and second radio communication apparatuses capable of radio-communicating with each other. The first radio communication apparatus comprises a propagation path environment estimator for outputting the estimation result as propagation path environment information, a propagation path quality estimator for outputting the estimation result as propagation path quality, and a transmitter for transmitting both the informations to the second radio communication apparatus. The second radio communication apparatus comprises a transmission mode selector for selecting one of the transmission modes used for communicating with the first radio communication.

17 Claims, 7 Drawing Sheets

RADIO COMMUNICATION SYSTEM AND TRANSMISSION MODE SELECTING METHOD

CROSS-REFERENCE TO RELATED APPLICATION

This application makes reference to, incorporates the same herein, and claims all benefits accruing under 35 U.S.C. § 119 from an application for "Radio Communication System And Transmission Mode Selecting Method" earlier filed in the Japanese Patent Office on Jun. 30, 2003 and duly assigned No. 2003-187156, and an International Application for the same title filed on Jun. 28, 2004 and duly assigned No. PCT/JP2004/009463.

BACKGROUND OF THE INVENTION

1. Field of the Invention

The present invention relates to a radio communication system and, more particularly, to a radio communication system which switches transmission modes in accordance with the propagation path quality.

2. Description of the Related Art

As a method of implementing high-speed, high-quality data transmission in a radio communication system, there is a method of switching transmission modes in accordance with the propagation path quality. Although the transmission modes to be switched change in accordance with the propagation path quality, parameters which change the contents are a modulation technique and encoding ratio.

The transmitting side selects, in accordance with the propagation path quality, an error correcting code encoding ratio k/n which is obtained by adding (n−k) redundancy bits to k information bits, and a modulation mode such as QPSK, 16QAM, or 64QAM capable of transmitting 2, 4, and 6 bits, respectively, for each modulation.

As the encoding ratio and the number of modulation bits increase, the maximum data transmission rate increases, but the propagation path quality (indicated by the signal-to-noise ratio S/N or signal power-to-interference ratio SIR) which satisfies the target communication quality (indicated by the block error rate, bit error rate, throughput, or the like) also increases.

In a radio communication system, the propagation path quality fluctuates owing to, e.g., the presence/absence of visibility between radio communication apparatuses, and interference from another radio communication apparatus. Therefore, the system throughput can be maximized if transmission is performed in accordance with the propagation path quality by an optimum one, by which the data transmission rate is maximum, of transmission modes (to be abbreviated as modulation/encoding modes hereinafter) using modulation techniques and encoding ratios which can satisfy the target communication quality.

Figure 1:
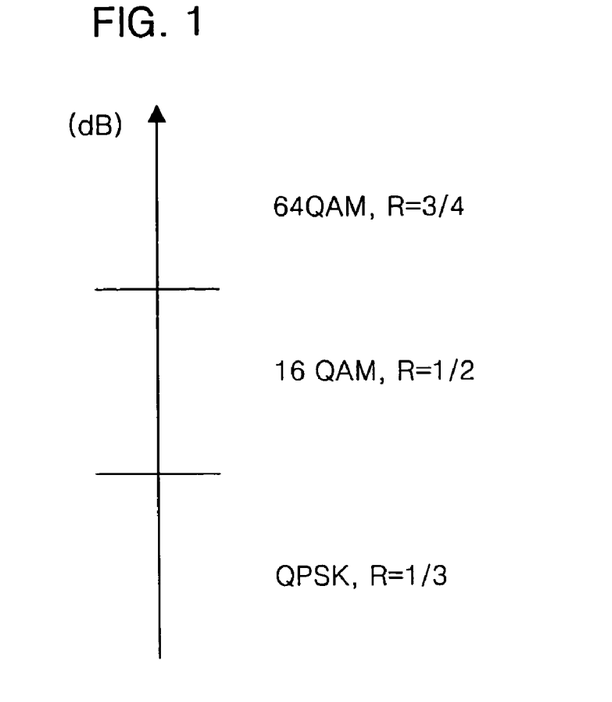
FIG. 1 is a view for explaining a conventional modulation/encoding mode selection table.

As a method of realizing the switching between modulation/encoding modes described above, as shown in FIG. 1, there is a method which predetermines the range of the the propagation path quality (dB) as a fixed threshold value, and determines a modulation/encoding mode in accordance with the propagation path quality obtained from a pilot signal which is known to the transmitting and receiving sides. In the example shown in FIG. 7, transmission is performed by the 64QAM modulation technique and encoding ratio R=3/4 when the propagation path quality is 12 dB or more, by the 16QAM modulation technique and encoding ratio R=1/2 when the propagation path quality is 5 dB (inclusive) to 12 dB (exclusive), and by the QPSK modulation technique and encoding ratio R=1/3 when the propagation path quality is less than 5 dB.

The propagation path quality is estimated by the receiving side and notified to the transmitting side, and the transmitting side compares this propagation path quality notified from the receiving side with the threshold value described above, and selects a modulation/encoding mode corresponding to the propagation path quality. However, an optimum modulation/encoding mode changes in accordance with the propagation path environment even for the same propagation path quality. Examples of determining factors of this propagation path environment are the multipath environment (the path count and the delay dispersion) and the maximum Doppler frequency (the moving velocity).

As described above, an optimum modulation/encoding mode changes in accordance with the propagation path environment even for the same propagation path quality. Conversely speaking, if the propagation path environment changes, the threshold value of the propagation path quality for selecting an optimum modulation/encoding mode changes. The larger the change in propagation path environment, the larger the change in threshold value of the propagation path quality for selecting an optimum modulation/encoding mode. Therefore, it is difficult to optimize the threshold value in the method which selects a modulation/encoding mode by comparing the propagation path quality with the fixed threshold value.

Figure 2:
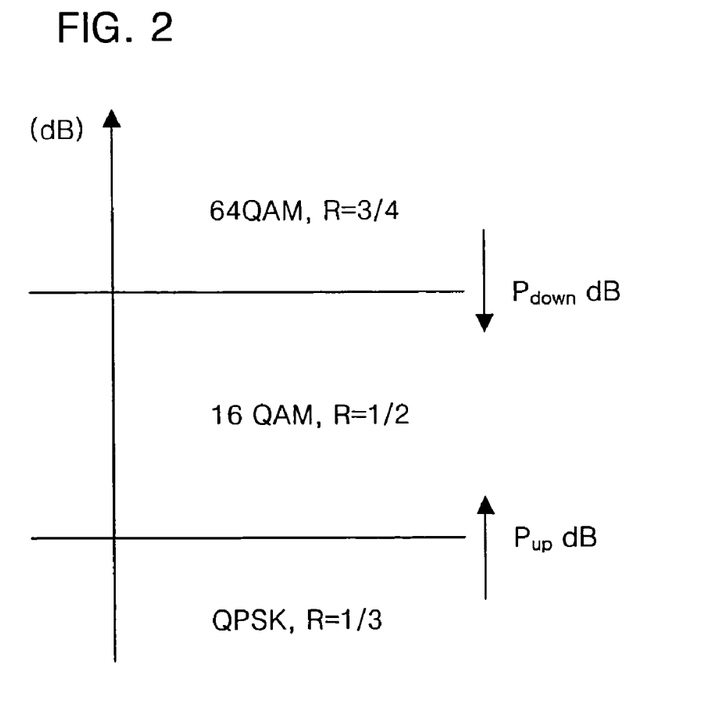
FIG. 2 is a view for explaining a conventional modulation/encoding mode selection table by which threshold values are variably controlled in accordance with the propagation path status.

As a method of solving the above problem, there is a method disclosed in patent reference 1 (Japanese Patent Laid-Open No. 2003-37554) in which threshold values are variably controlled on the basis of the presence/absence of a reception error for each information block. In this method, a modulation/encoding mode to be selected is determined by comparing the reception quality of a pilot signal with a plurality of threshold values stored in a threshold value table, and the contents of the determination are output as a switching designation. As shown in FIG. 2, a plurality of threshold values are variably controlled on the basis of the presence/absence of a reception error notification from the receiving side. If the reception of an information block is successful, the upper limit of the threshold value range of the propagation path quality for the modulation/encoding mode currently being used is decreased by a predetermined value Pdown dB. If the reception of an information block has failed a predetermined number of times, the lower limit of the threshold value range described above is increased by a predetermined value Pup dB. In this manner, there is provided a radio communication system in which an optimum threshold value for use in the selection of a modulation/encoding mode is set in accordance with the propagation path quality.

Of the above-mentioned conventional techniques, it is difficult to optimize the threshold value if a modulation/encoding mode is determined by comparing the propagation path quality with the fixed threshold value.

The method disclosed in patent reference 1 can determine an optimum threshold value in accordance with changes in propagation path environment. However, it takes a long time to change the threshold value of the propagation path quality to an optimum value, and the larger the change width to the optimum threshold value, the longer the time necessary for converging to the optimum threshold value.

SUMMARY OF THE INVENTION

The present invention has been made in consideration of the situation of the conventional techniques as described above and, and can provide a radio communication system and transmission mode selection method capable of rapidly selecting an optimum transmission mode in accordance with the propagation path quality and propagation path status.

According to the first principal aspect of the present invention, there is provided a radio communication apparatus comprising first and second radio communication apparatuses which can communicate with each other by radio, wherein the first radio communication apparatus comprises a propagation path environment estimator which outputs, as propagation path environment information, a result of estimation of an environment of a propagation path to the second radio communication apparatus on the basis of a signal from the second radio communication apparatus, a propagation path quality estimator which outputs, as propagation path quality information, a result of estimation of quality of the propagation path to the second radio communication apparatus on the basis of the signal from the second radio communication apparatus, and transmitting means for transmitting the propagation path environment information and propagation path quality information together with a data signal to the second radio communication apparatus, and the second radio communication apparatus comprises a transmission mode selector which includes a plurality of tables in which a plurality of transmission modes each having a threshold value corresponding to a value of the propagation path quality information are registered, selects one of the plurality of tables in accordance with the propagation path environment information, and selects, as a mode for transmission to the first radio communication apparatus, one of the transmission modes registered in the selected table in accordance with the propagation path quality information.

The radio communication system described in the above first principal aspect can take various secondary aspects as follows.

First, the first radio communication apparatus may also comprise an error detector which detects an error in the signal from the second radio communication apparatus and outputs the error as an error detection result, and the transmitting means may also transmit the propagation path environment information, propagation path quality information, and error detection result together with a data signal to the second radio communication apparatus, and the transmission mode selector of the second radio communication apparatus may also rewrite, in accordance with the error detection result, a threshold value registered in the table to correspond to the selected transmission mode.

The path count may also be used as the propagation path environment information. In this case, a plurality of tables may also correspond to path counts $P1, P2, \ldots, PR$ ($P1, P2, \ldots, PR$ are natural numbers and satisfy $P1<P2<\ldots<PR$).

A maximum Doppler frequency may also be used as the propagation path environment information. In this case, a plurality of tables may also correspond to maximum Doppler frequencies $f0, f1, \ldots, fR-1$ ($f0<f1<\ldots<fR-1$), and, with respect to a threshold value $xi$ ($xi$ is an arbitrary number which satisfies $fi<xi<fi+1$, and i is an integer from 0 to R-2), if a maximum Doppler frequency fd is $xj-1<fd<xj$ (j is an integer from 1 to R-2), fj can be selected as the maximum Doppler frequency, if $fd \leq x0$, f0 can be selected as the maximum Doppler frequency, and if $fd>xR-2$, $fR-1$ can be selected as the maximum Doppler frequency.

A delay dispersion may also be used as the propagation path environment information. In this case, a plurality of tables may also correspond to delay dispersions $\sigma 0, \sigma P, \ldots, \sigma q-1$ ($\sigma 0<\sigma 1<\ldots<\sigma R-1$), and, with respect to a threshold value $xi$ ($xi$ is an arbitrary value which satisfies $\sigma i<xi<\sigma i+1$, and i is an integer from 0 to R-2), if a delay dispersion $\sigma$ is $xj-1<\sigma \leq xj$ (j is an integer from 1 to R-2), $\sigma j$ can be selected as the delay dispersion, if $\sigma \leq x0$, $\sigma 0$ can be selected as the delay dispersion, and if $\sigma>xR-2$, $\sigma R-1$ can be selected as the delay dispersion.

A plurality of selection tables may also correspond to combinations of path counts $P1, P2, \ldots, PJ$ ($P1, P2, \ldots, PJ$ are natural numbers equal to or smaller than R and satisfy $P1<P2<\ldots<PJ$) and maximum Doppler frequencies $f0, f1, \ldots, fK-1$ (K is a natural number equal to or smaller than R and satisfies $J \times K=R$).

A plurality of tables may also correspond to combinations of path counts $P1, P2, \ldots, PJ$ ($P1, P2, \ldots, PJ$ are natural numbers and satisfy $P1<P2<\ldots<PJ$) and delay dispersions $\sigma 0, \sigma P, \ldots, \sigma k-1$ (L is a natural number equal to or smaller than R and $J \times L=R$) (if the path count is 1, the delay dispersion is not used as the propagation path environment information).

A plurality of tables may also correspond to combinations of maximum Doppler frequencies f0 to fK-1 and delay dispersions $\sigma 0$ to $\sigma L-1$ (L is a natural number equal to or smaller than R and $K \times L=R$).

A plurality of tables may also correspond to combinations of path counts $P1, P2, \ldots, PJ$, maximum Doppler frequencies f0 to fK-1, and delay dispersions $\sigma 0$ to $\sigma L-1$ (J, K, L, and R are natural numbers which satisfy $J \times K \times L=R$) (if the path count is 1, the delay dispersion is not used as the propagation path environment information).

A signal-to-interference ratio may also be used as the propagation path quality information.

A signal-to-noise ratio may also be used as the propagation path quality information.

A modulation technique may also be used as a parameter of a transmission mode.

An encoding ratio may also be used as a parameter of a transmission mode.

A transmission power may also be used as a parameter of a transmission mode.

According to the second principal aspect of the present invention, there is provided a transmission mode selection method performed in a radio communication system comprising first and second radio communication apparatuses which can communicate with each other by radio, wherein the method comprises the first step, performed by the first radio communication apparatus, of estimating propagation path environment information indicating an environment of a propagation path to the second radio communication apparatus on the basis of a signal from the second radio communication apparatus, the second step, performed by the first radio communication apparatus, of estimating propagation path quality information indicating quality of the propagation path to the second radio communication apparatus on the basis of the signal from the second radio communication apparatus, the third step, performed by the first radio communication apparatus, of transmitting the propagation path environment information and propagation path quality information together with a data signal to the second radio communication apparatus, and the fourth step, performed by the second radio communication apparatus, of selecting, in accordance with the propagation path environment information, one of a plurality of tables in each of which a plurality of transmission modes each having a threshold value corresponding to a value of the propagation path quality information are registered, and selecting, as a mode for transmission to the first radio communication apparatus, one of the transmission modes registered in the selected table in accordance with the propagation path quality information.

According to the third principal aspect of the present invention, there is provided a transmission mode selection method performed in a radio communication system comprising first and second radio communication apparatuses which can communicate with each other by radio, wherein the method comprises the first step, performed by the first radio communication apparatus, of estimating propagation path environment information indicating an environment of a propagation path to the second radio communication apparatus on the basis of a signal from the second radio communication apparatus, the second step, performed by the first radio communication apparatus, of estimating propagation path quality information indicating quality of the propagation path to the second radio communication apparatus on the basis of the signal from the second radio communication apparatus, the third step, performed by the first radio communication apparatus, of obtaining an error detection result indicating an error in the signal from the second radio communication apparatus, the fourth step, performed by the first radio communication apparatus, of transmitting the propagation path environment information, propagation path quality information, and error detection result together with a data signal to the second radio communication apparatus, and the fifth step, performed by the second radio communication apparatus, of selecting, in accordance with the propagation path environment information, one of a plurality of tables in each of which a plurality of transmission modes each having a threshold value corresponding to a value of the propagation path quality information are registered, selecting, as a mode for transmission to the first radio communication apparatus, one of the transmission modes registered in the selected table in accordance with the propagation path quality information, and rewriting, in accordance with the error detection result, a threshold value registered in the table to correspond to the selected transmission mode.

The present invention having the above aspects is characterized by including a plurality of tables selected in accordance with the propagation path environment information. A plurality of transmission modes each having a threshold value corresponding to the value of the propagation path quality information are registered in each table, one of these tables is selected in accordance with the propagation path environment information, and one of the transmission modes registered in the selected table is selected in accordance with the propagation path quality information. Therefore, a transmission mode corresponding to the propagation path environment information and propagation path quality information is rapidly selected.

Accordingly, the present invention has an effect of being able to rapidly select a transmission mode corresponding to the propagation path environment and propagation path quality.

Also, if the threshold value based on the propagation path quality when a transmission mode is selected is to be rewritten in accordance with the error detection result, the threshold value can be optimally set in accordance with the propagation path status.

The above and many other aspects, features, and advantages of the present invention will be apparent to those skilled in the art by the following detailed description of the preferred embodiments conforming to the principle of the present invention in conjunction with the accompanying drawings.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference numerals and symbols indicate the same or similar components, wherein.

DETAILED DESCRIPTION OF THE PREFERRED EMBODIMENTS

Several preferred embodiments of the present invention will be described in detail below with reference to the accompanying drawings.

Figure 3:
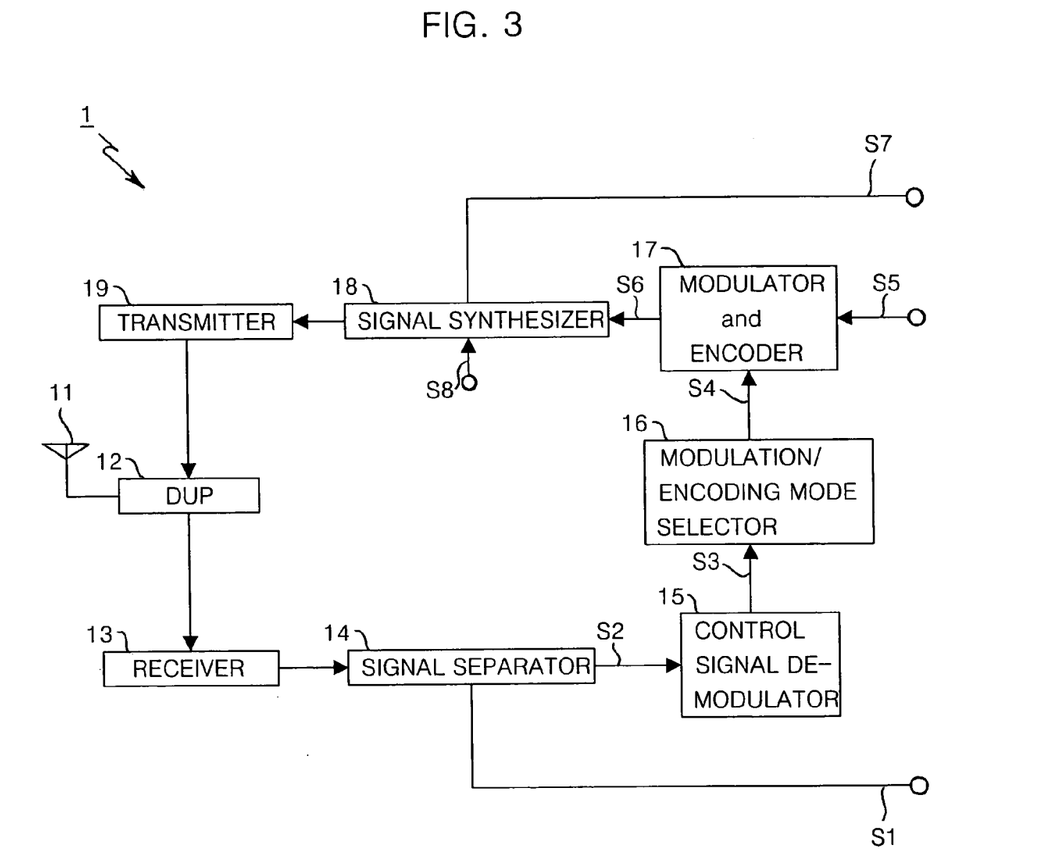
FIGS. 3 and 4 are block diagrams showing the arrangements of two radio communication apparatuses used in a radio communication system according to the first embodiment of the present invention.
Figure 4:
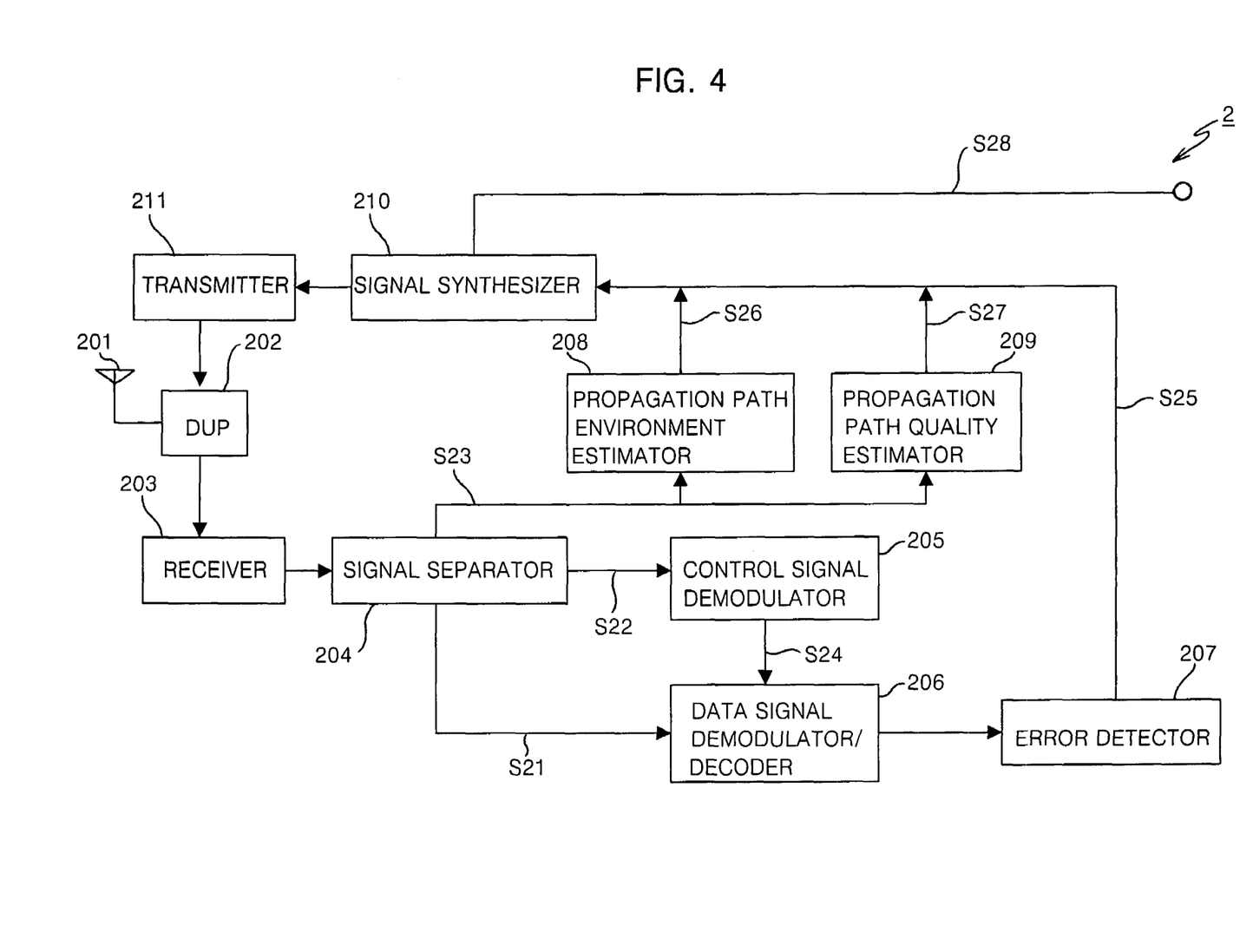
Figure 5:
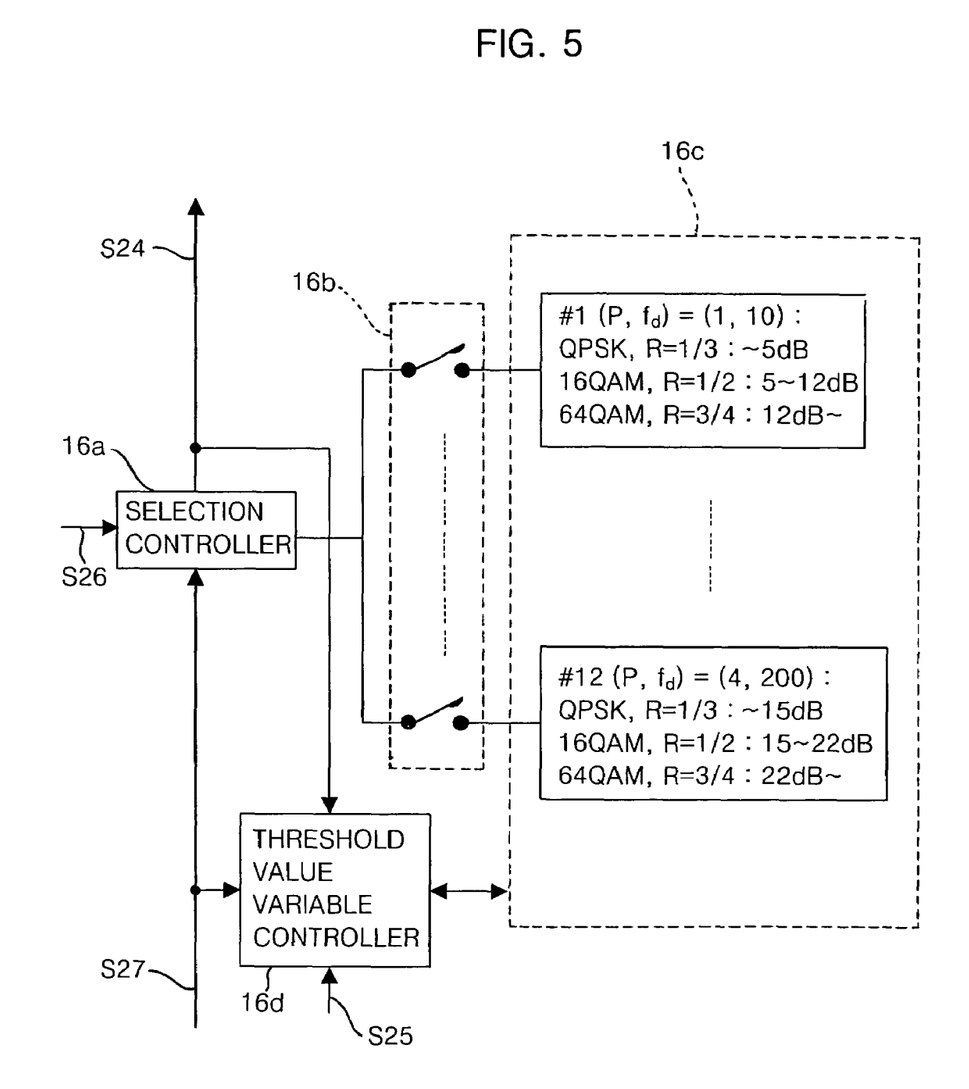
FIG. 5 is a detailed view of a modulation/encoding mode selector in the radio communication apparatus shown in FIG. 1.

FIGS. 3 and 4 are block diagrams showing the arrangements of radio communication apparatuses 1 and 2, respectively, which communicate with each other by radio in a radio communication system according to the first embodiment of the present invention. Also, FIG. 5 is a block diagram showing details of the arrangement of a modulation/encoding mode selector 16 shown in FIG. 3.

The radio communication apparatus 1 shown in FIG. 3 comprises an antenna 11, duplexer 12 (DUP), receiver 13, signal separator 14, control signal demodulator 15, modulation/encoding mode selector (transmission mode selector) 16, modulator/encoder 17, signal synthesizer 18, and transmitter 19.

The receiver 13 supplies, to the signal separator 14, a signal received from the radio communication apparatus 2 via the antenna 11 and duplexer 12. The signal separator 14 separates the signal from the radio communication apparatus 2 into a data signal S1 and control signal S2, and supplies the control signal S2 to the control signal demodulator 15. The control signal demodulator 15 demodulates the control signal into control information S3, and supplies, to the modulation/encoding mode selector 16, propagation path quality information, propagation path environment information, and an error detection result contained in the control information S3.

The modulation/encoding mode selector 16 includes a plurality of modulation/encoding mode selection tables each containing a plurality of modulation/encoding modes. In each modulation/encoding mode selection table, a plurality of modulation/encoding modes are stored to correspond to different propagation path quality values (threshold values).

The modulation/encoding mode selector 16 selects one of a plurality of modulation/encoding mode selection tables on the basis of the propagation path environment information contained in the control information S3 supplied from the control signal demodulator 15, selects a modulation/encoding mode from the selected modulation/encoding mode selection table on the basis of the propagation path quality information contained in the control information S3, and supplies the selection result as modulation/encoding mode information to the modulator/encoder 17.

FIG. 5 is a detailed view of the modulation/encoding mode selector 16 in the radio communication apparatus 1 shown in FIG. 3. The modulation/encoding mode selector 16 includes a selection controller 16a, a table switch 16b, modulation/encoding mode selection tables 16c, and a threshold value variable controller 16d.

In the modulation/encoding mode selection tables 16c, 12 modulation/encoding mode selection tables (P, fd)=(1, 10), (1, 100), ..., (4, 100), (4, 200)=#1 to #12 corresponding to path counts P=1, 2, 3, and 4 and maximum Doppler frequencies fd=10, 100, and 200 Hz (threshold values are 50 and 150 Hz) are registered. An arbitrary number of modulation/encoding mode selection tables are prepared in accordance with the path counts P and the maximum Doppler frequencies fd.

The selection controller 16a controls the table switch 16b on the basis of the propagation path environment information contained in the control information S3, and selects a modulation/encoding mode selection table to be used from the modulation/encoding mode selection tables 16c. As an example, if an estimated path count is 2 and the maximum Doppler frequency is 80 Hz, modulation/encoding mode selection table #5=(2, 100) corresponding to a maximum Doppler frequency of 100 Hz is selected on the basis of the path count 2 and 50 and 100 Hz as the threshold values. If the estimated path count is larger than 4, a modulation/encoding mode selection table corresponding to the path count 4 is selected.

Then, the selection controller 16a compares the propagation path quality information contained in the control information S3 with a plurality of threshold values stored in the modulation/encoding mode selection table selected from the tables 16c, determines a modulation/encoding mode to be selected, and outputs the selected modulation/encoding mode as modulation/encoding mode information S4.

The threshold value variable controller 16d rewrites a plurality of threshold values stored in the modulation/encoding mode selection table, on the basis of the error detection result contained in the control information S3. If the reception of an information block is successful, the threshold level of the range of the propagation path quality corresponding to the modulation/encoding mode currently being used is decreased by a predetermined value Pdown dB. If the reception of an information block has failed a predetermined number of times, the threshold level is increased by a predetermined value Pup dB.

The modulator/encoder 17 encodes and modulates an input information bit S5 on the basis of the modulation/encoding mode information S4. After that, the modulator/encoder 17 supplies, to the signal synthesizer 18, the bit as a data signal S6 to which a CRC (Cyclic Redundancy Check) code is added. The signal synthesizer 18 synthesizes the data signal S6, a pilot signal S7, and a control signal S8 indicating the modulation/encoding mode information, and supplies the synthetic signal from the antenna 11 to the radio communication apparatus 2 via the transmitter 19 and duplexer 12.

The radio communication apparatus 2 shown in FIG. 4 comprises an antenna 201, duplexer 202, receiver 203, signal separator 204, control signal demodulator 205, data signal demodulator/decoder 206, error detector 207, propagation path environment estimator 208, propagation path quality estimator 209, signal synthesizer 210, and transmitter 211.

The receiver 203 supplies, to the signal separator 204, a signal received from the radio communication apparatus 1 via the antenna 201 and duplexer 202. The signal separator 204 separates the signal from the radio communication apparatus 1 into a data signal S21, control signal S22, and pilot signal S23, supplies the data signal S21 to the data signal demodulator/decoder 206, supplies the control signal S22 to the control signal demodulator 205, and supplies the pilot signal S23 to the propagation path environment estimator 208 and propagation path quality estimator 209.

The control signal demodulator 205 demodulates the control signal S22 into control information, and supplies, to the data signal demodulator/decoder 206, modulation/encoding mode information S24 which is contained in the control information and designates a modulation technique and encoding ratio. The data signal demodulator/decoder 206 demodulates and decodes the data signal S21 supplied from the signal separator 204 by using the modulation technique and encoding ratio designated by the modulation/encoding mode information S24, and supplies the decoded data to the error detector 207.

The error detector 207 determines the presence/absence of an information data block reception error by using a CRC code added to the data decoded by the data signal demodulator/decoder 206, and supplies the determination result as an error detection result S25 to the signal synthesizer 210.

The propagation path environment estimator 208 estimates the propagation path environment by the input pilot signal S23, and supplies the estimated environment as propagation path environment information S26 to the signal synthesizer 210. The propagation path quality estimator 209 estimates a signal power-to-interference ratio (SIR) and signal-to-noise (S/N) ratio by the input pilot signal S23, and supplies the estimated ratios as propagation path quality information to the signal synthesizer 210.

The signal synthesizer 210 synthesizes a data signal S28 to be transmitted, the error detection result S25, the propagation path environment information S26, and propagation path quality information S27, and transmits the synthetic signal from the antenna 201 to the radio communication apparatus 1 via the transmitter 211 and duplexer 202. The radio communication apparatus 1 uses the data signal S28 as the data signal S1, and uses the error detection result S25, propagation path environment information S26, and propagation path quality information S27 as the control information S3.

By the above operation, optimum setting of a modulation/encoding selection table can be rapidly and easily performed in accordance with the propagation path status.

The second embodiment of the present invention will be described below. As another method which realizes a high-quality data transmission method in a radio communication system, there is a method which adaptively controls the transmission power so that the propagation path quality is constant. In this method, the propagation path quality capable of satisfying the target communication quality (indicated by, e.g., the block error rate, bit error rate, and throughput) is preset as target propagation path quality for each modulation/encoding mode.

A receiving apparatus estimates the propagation path quality, and compares the estimated propagation path quality with the target propagation path quality of the modulation/encoding mode currently being used. The receiving apparatus instructs the transmitting side to increase the transmission power if the estimated propagation path quality is lower than the target propagation path quality, and instructs the transmitting side to decrease the transmission power if the estimated propagation path quality is greater than the target propagation path quality.

If the propagation path environment changes, however, the optimum target propagation path quality capable of satisfying the target communication quality changes. The optimum target propagation path quality herein mentioned is a minimum propagation path quality value capable of satisfying the target communication quality. Even in a case like this, it is difficult to optimally set the target value of the propagation path quality corresponding to each modulation/encoding mode, as in the setting of the threshold value of the modulation/encoding mode described above. The arrangement of the present invention is adaptable to the above-mentioned problem as well. This embodiment will be explained below as the second embodiment of the present invention.

Figure 6:
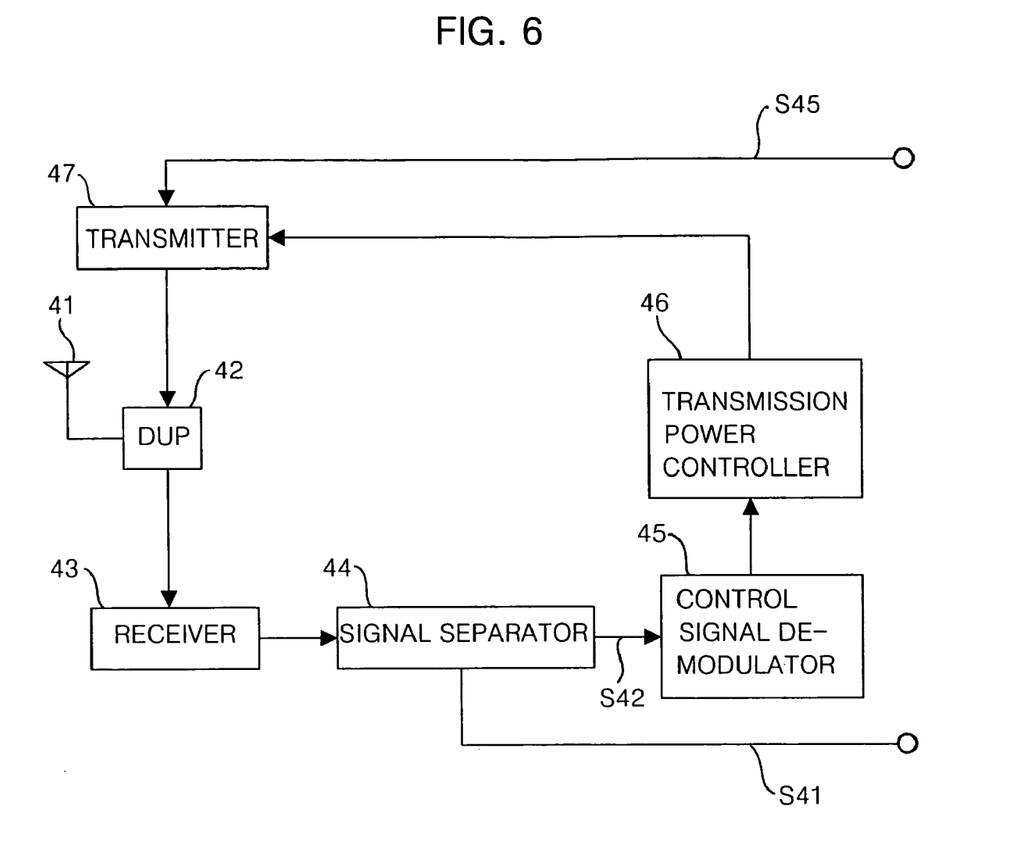
FIGS. 6 and 7 are block diagrams showing the arrangements of two radio communication apparatuses used in a radio communication system according to the second embodiment of the present invention.
Figure 7:
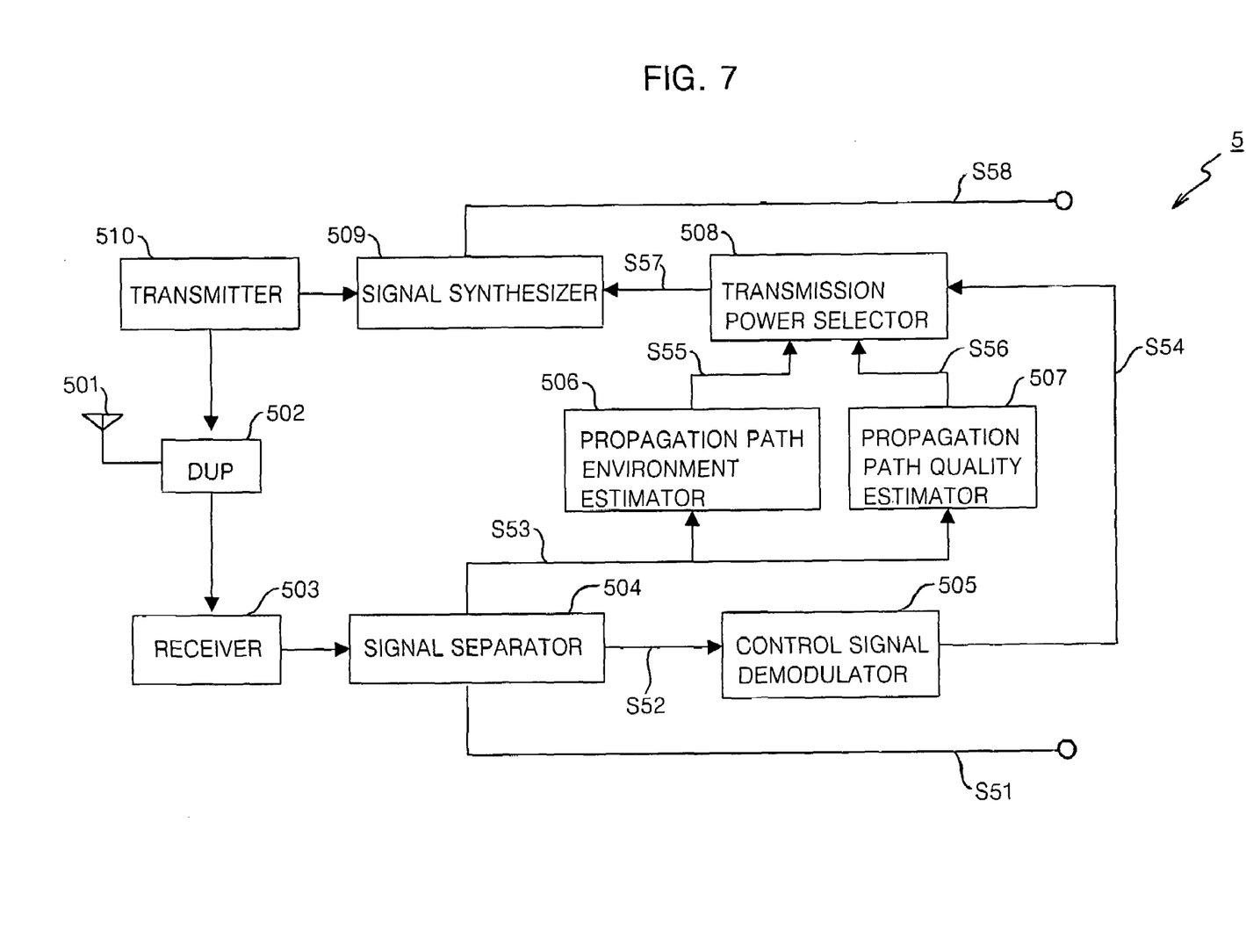

FIGS. 6 and 7 are block diagrams showing the arrangements of radio communication apparatuses 4 and 5, respectively, which communicate with each other by radio in a radio communication system according to the second embodiment of the present invention.

The radio communication apparatus 4 shown in FIG. 6 comprises an antenna 41, duplexer 42 (DUP), receiver 43, signal separator 44, control signal demodulator 45, transmission power controller 46, and transmitter 47.

The receiver 43 supplies, to the signal separator 44, a signal received from the radio communication apparatus 5 via the antenna 41 and duplexer 42. The signal separator 44 separates the signal from the radio communication apparatus 5 into a data signal S41 and control signal S42, and supplies the control signal S42 to the control signal demodulator 45. The control signal demodulator 45 demodulates the control signal S42 into control information, and supplies, to the transmission power controller 46, transmission power control mode information S43 contained in the control information.

The transmission power controller 46 determines a transmission power set value S44 on the basis of the input transmission power control mode information S43, and supplies the transmission power set value S44 to the transmitter 47. The transmitter 47 amplifies a transmission signal S45 in accordance with the transmission power set value S44 from the transmission power controller 46. The transmission signal S45 is obtained by synthesizing a control signal indicating a modulation/encoding mode, a data signal corresponding to the modulation/encoding mode, and a pilot signal, and the amplified transmission signal is transmitted from the antenna 41 to the radio communication apparatus 5 via the duplexer 42.

The radio communication apparatus 5 comprises an antenna 501, duplexer 502, receiver 503, signal separator 504, control signal demodulator 505, propagation path environment estimator 506, propagation path quality estimator 507, transmission power selector (transmission mode selector) 508, signal synthesizer 509, and transmitter 510.

The receiver 503 supplies, to the signal separator 504, a signal received from the radio communication apparatus 4 via the antenna 501 and duplexer 502. The signal separator 504 separates the signal from the receiver 503 into a data signal S51, control signal S52, and pilot signal S53, supplies the control signal S52 to the control signal demodulator 505, and supplies the pilot signal S53 to the propagation path environment estimator 506 and propagation path quality estimator 507.

The control signal demodulator 505 demodulates the control signal S52 into control information, and supplies modulation/encoding mode information S54 contained in the control information to the transmission power selector 508. The propagation path environment estimator 506 estimates the propagation path environment by the input pilot signal S53, and supplies the estimated environment as propagation path environment information S55 to the transmission power selector 508. The propagation path quality estimator 507 estimates a signal power-to-interference ratio (SIR) and signal-to-noise ratio (S/N) by the input pilot signal, and supplies them as propagation path quality information S56 to the transmission power selector 508.

Figure 8:
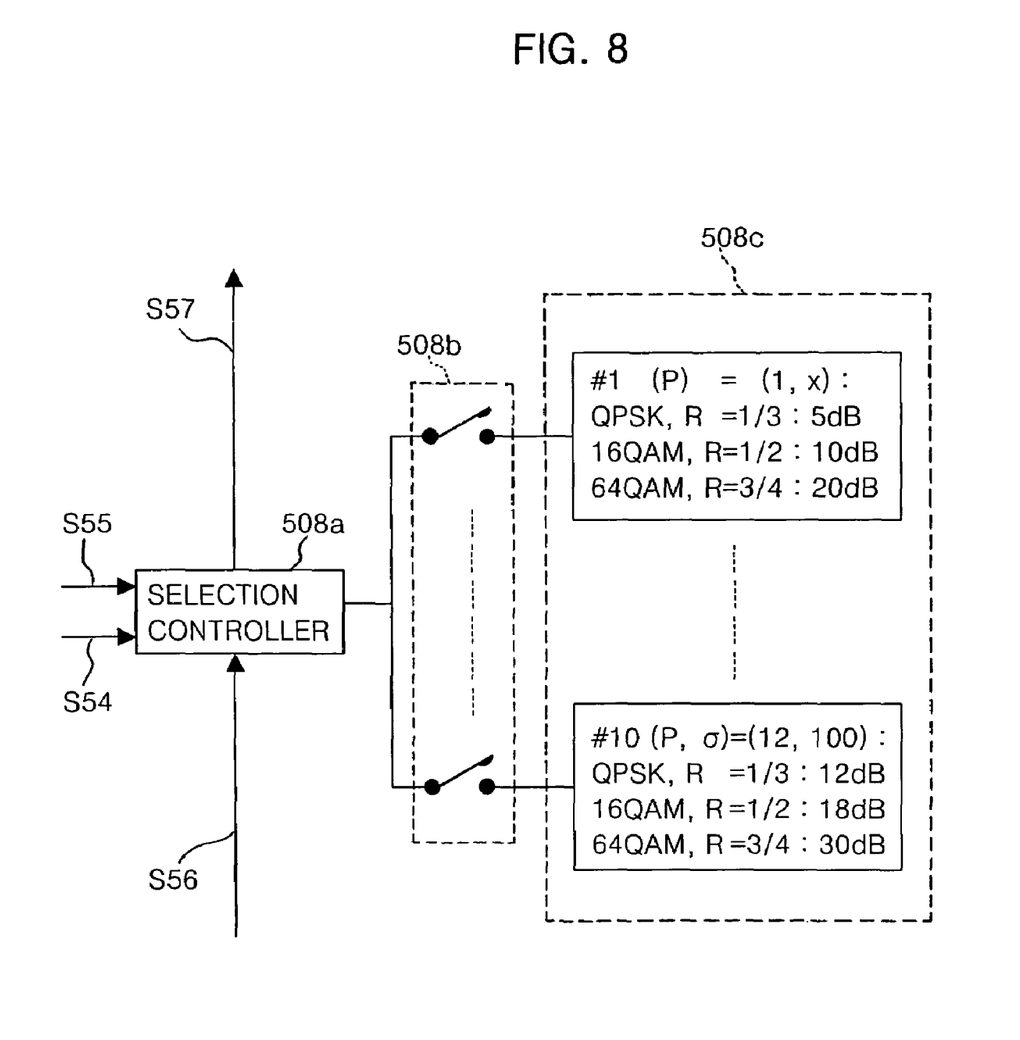
FIG. 8 is a detailed view of a transmission power selector in the radio communication apparatus shown in FIG. 7.

FIG. 8 is a detailed view of the transmission power selector 508 in the radio communication apparatus 5 shown in FIG. 7. The transmission power selector 508 includes a selection controller 508a, table switch 508b, and transmission power control mode selection tables 508c.

In the transmission power control mode selection tables 508c, 10 transmission power control mode selection tables (P, σ)=(1, x), (4, 10), (4, 40), . . . , (12, 40), (12, 100)=#1 to #10 corresponding to combinations of path counts 1, 4, 8, and 12 (threshold values are 2, 6, and 9) and delay dispersions of 10, 40, and 100 ns (threshold values are 20 and 70 ns) are registered. Note that x represents that no value is allocated. An arbitrary number of transmission power control mode tables are prepared in accordance with the path counts and the types of delay dispersions.

Each transmission power control mode selection table stores different target propagation path quality values for a plurality of modulation/encoding modes. Upon receiving the propagation path quality information S55 from the propagation path quality estimator S507, the transmission power selector 508 controls the table switch 508b on the basis of the propagation path quality information S55, and selects a table to be used from the transmission power control mode tables 508c. As an example, if an estimated path count is 7 and the delay dispersion is 110 ns, table #7=(8, 100) corresponding to the path count 8 on the basis of threshold values of 6 and 9 and corresponding to a delay dispersion of 100 ns on the basis of a threshold value of 70 is selected.

Then, the transmission power selector 508 compares the estimated propagation path quality indicated by the propagation path quality information S56 with the target propagation path quality value set in accordance with the modulation/encoding mode stored in the selected table and currently being used. The transmission power selector 508 determines that the transmission power is to be increased if the estimated propagation path quality value is smaller than the target propagation path quality value, determines that the transmission power is to be decreased if the estimated propagation path quality is higher than the target propagation path quality, and supplies the determined contents as transmission power control mode information S57 to the signal synthesizer 509.

The signal synthesizer 509 synthesizes a data signal S58 and the transmission power control mode information S57, and transmits the synthetic signal from the antenna 501 to the radio communication apparatus 4 via the transmitter 510 and duplexer 502.

By the above operation, optimum setting of the transmission power can be rapidly and easily performed in accordance with the propagation path status.

What is claimed is:

1. A radio communication system comprising first and second radio communication apparatuses which can communicate with each other by radio,
wherein said first radio communication apparatus comprises:
a propagation path environment estimator which outputs, as propagation path environment information, a result of estimation of an environment of a propagation path to said second radio communication apparatus on the basis of a signal from said second radio communication apparatus;
a propagation path quality estimator which outputs, as propagation path quality information, a result of estimation of quality of the propagation path to said second radio communication apparatus on the basis of the signal from said second radio communication apparatus;
an error detector which detects an error in the signal from said second radio communication apparatus and outputs the error as an error detection result; and
transmitting means for transmitting the propagation path environment information, propagation path quality information, and error detection result together with a data signal to said second radio communication apparatus,
wherein said second radio communication apparatus comprises:
a transmission mode selector which includes a plurality of tables in which a plurality of transmission modes each having a threshold value corresponding to a value of the propagation path quality information are registered, selects one of said plurality of tables in accordance with the propagation path environment information, and selects, as a mode for transmission to said first radio communication apparatus, one of the transmission modes registered in the selected table in accordance with the propagation path quality information,
wherein said transmission mode selector of said second radio communication apparatus rewrites, in accordance with the error detection result, a threshold value registered in the table to correspond to the selected transmission mode.

2. A radio communication system according to claim 1, wherein a path count is used as the propagation path environment information.

3. A radio communication system according to claim 2, wherein the plurality of tables correspond to path counts P1, P2, ..., PR (P1, P2, ..., PR are natural numbers and satisfy P1<P2< ... <PR).

4. A radio communication system according to claim 1, wherein a maximum Doppler frequency is used as the propagation path environment information.

5. A radio communication system according to claim 4, wherein the plurality of tables correspond to maximum Doppler frequencies f0, f1, ..., fR−1 (f0<f1< ... <fR−1), and, with respect to a threshold value xi (xi is an arbitrary number which satisfies fi<xi<fi+1, and i is an integer from 0 to R−2), if a maximum Doppler frequency fd is xj−1<fd≦xj (j is an integer from 1 to R−2), fj is selected as the maximum Doppler frequency, if fd≦x0, f0 is selected as the maximum Doppler frequency, and if fd>xR−2, fR−1 is selected as the maximum Doppler frequency.

6. A radio communication system according to claim 1, wherein a delay dispersion is used as the propagation path environment information.

7. A radio communication system according to claim 6, wherein the plurality of tables correspond to delay dispersions σ0, σP, ..., σR−1 (σ0<σ1< ... <σR−1), and, with respect to a threshold value xi (xi is an arbitrary value which satisfies σi<xi<σi+1, and i is an integer from 0 to R−2), if a delay dispersion σ is xj−1<σ≦xj (j is an integer from 1 to R−2), σj is selected as the delay dispersion, if σ≦x0, σ0 is selected as the delay dispersion, and if σ>xR−2, σR−1 is selected as the delay dispersion.

8. A radio communication system according to claim 1, wherein the plurality of selection tables correspond to combinations of path counts P1, P2, ..., PJ (P1, P2, ..., PJ are natural numbers not more than R and satisfy P1<P2< ... <PJ) and maximum Doppler frequencies f0, f1, ..., fK−1 (K is a natural number not more than R and satisfies J×K=R).

9. A radio communication apparatus according to claim 1, wherein the plurality of tables correspond to combinations of path counts P1, P2, ..., PJ (P1, P2, ..., PJ are natural numbers and satisfy P1<P2< ... <PJ) and delay dispersions σ0, σP, ..., σk−1 (k is a natural number not more than R and J×k=R) (if the path count is 1, the delay dispersion is not used as the propagation path environment information).

10. A radio communication system according to claim 1, wherein the plurality of tables correspond to combinations of maximum Doppler frequencies f0 to fk−1 and delay dispersions σ0 to σL−1 (L is a natural number not more than R and K×L=R).

11. A radio communication system according to claim 1, wherein the plurality of tables correspond to combinations of path counts P1, P2, ..., PJ, maximum Doppler frequencies f0 to fk−1, and delay dispersions σ0 to σL−1 (J, K, L, and R are natural numbers which satisfy J×K×L=R) (if the path count is 1, the delay dispersion is not used as the propagation path environment information).

12. A radio communication system according to claim 1, wherein a signal-to-interference ratio is used as the propagation path quality information.

13. A radio communication system according to claim 1, wherein a signal-to-noise ratio is used as the propagation path quality information.

14. A radio communication system according to claim 1, wherein a modulation technique is used as a parameter of a transmission mode.

15. A radio communication system according to claim 1, wherein an encoding ratio is used as a parameter of a transmission mode.

16. A radio communication system according to claim 1, wherein a transmission power is used as a parameter of a transmission mode.

17. A transmission mode selection method preformed in a radio communication system comprising first and second radio communication apparatuses which can communicate with each other by radio, wherein the method comprises:
estimating, by the first radio communication apparatus, propagation path environment information indicating an environment of a propagation pat to the second radio communication apparatus on the basis of a signal from the second radio communication apparatus;
estimating, by the first radio communication apparatus, propagation path quality information indicating quality of the propagation path to the second radio communication apparatus on the basis of the signal from the second radio communication apparatus;

obtaining, by the first radio communication apparatus, an error detection result indicating an error in the signal from the second radio communication apparatus;

transmitting, by the first radio communication apparatus, the propagation path environment information, propagation path quality information, and error detection result together with a data signal to the second radio communication apparatus; and selecting, by the second radio communication apparatus, of in accordance with the propagation path environment information, one of a plurality of tables in each of which a plurality of transmission modes each having a threshold value corresponding to a value of the propagation path quality information are registered, selecting, as a mode for transmission to the first radio communication apparatus, one of the transmission modes registered in the selected table in accordance with the propagation path quality information, and rewriting, in accordance with the error detection result, a threshold value registered in the table to correspond to the selected transmission mode.

* * * * *